United States Patent Office 3,357,452
Patented Dec. 12, 1967

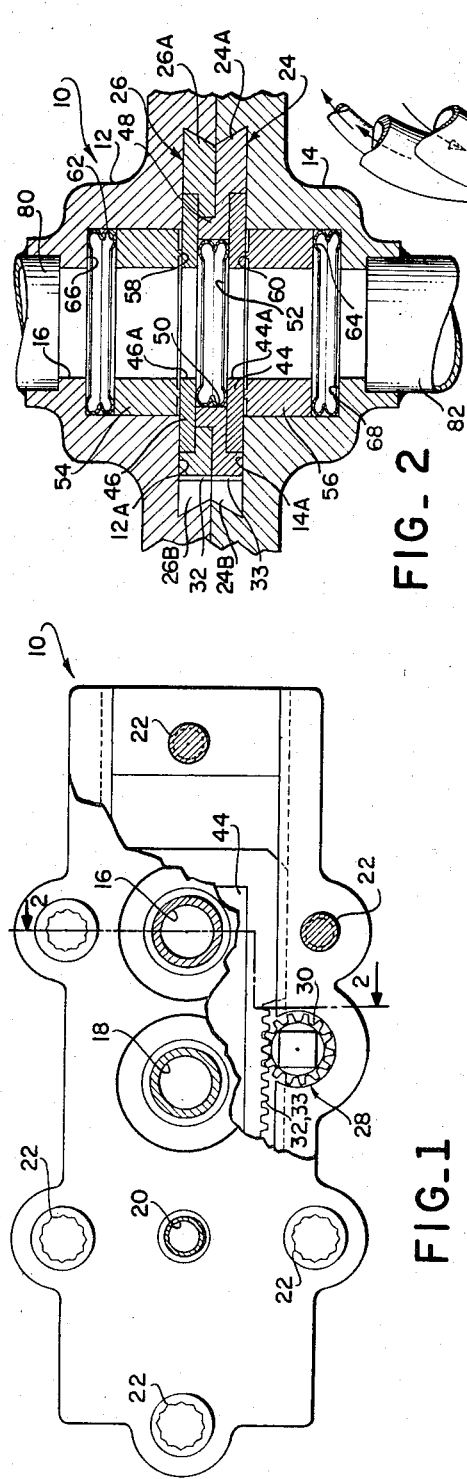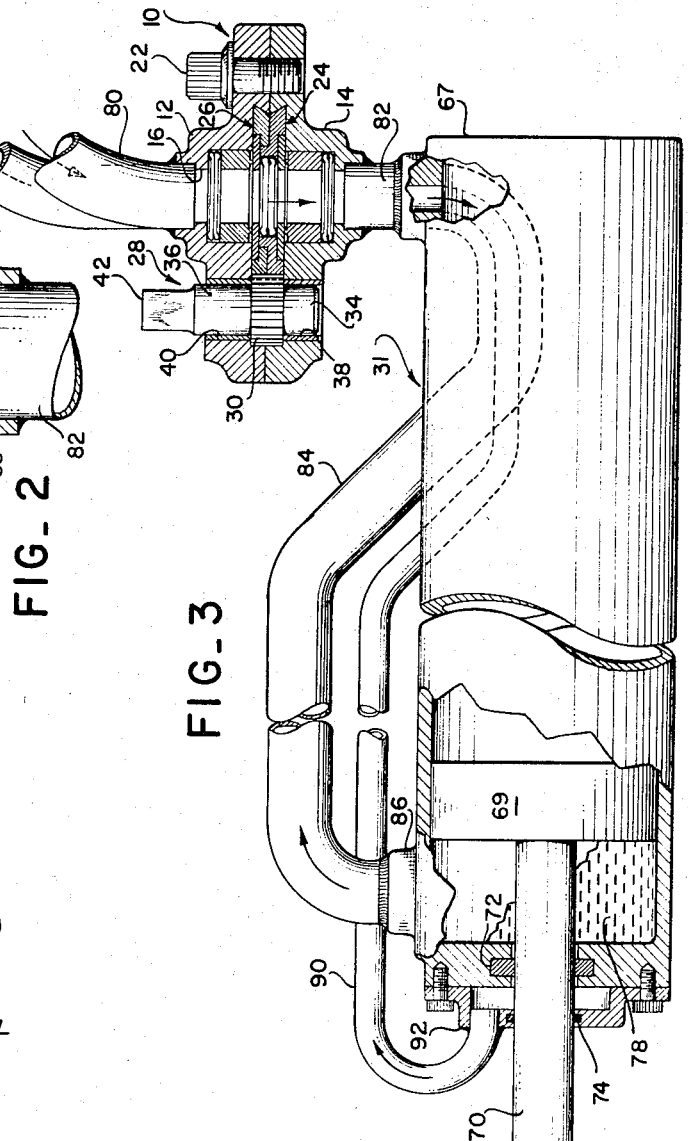

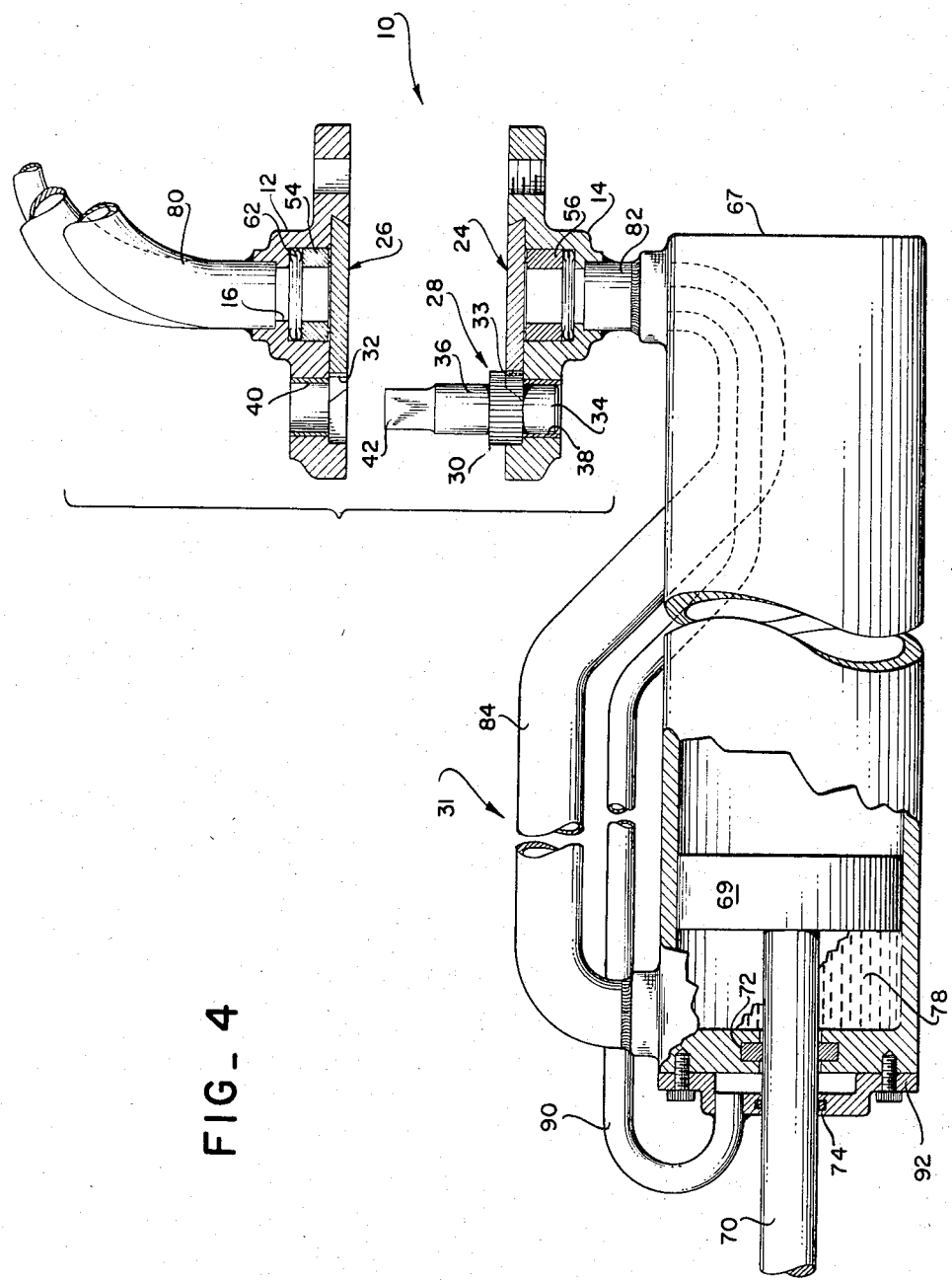

3,357,452
QUICK-DISCONNECT COUPLING
Artemas M. Larkin, Glendale, and Ralph E. Middleton, North Hollywood, Calif., assignors to Lockheed Aircraft Corporation, Burbank, Calif.
Filed Oct. 1, 1965, Ser. No. 492,143
5 Claims. (Cl. 137—614.01)

ABSTRACT OF THE DISCLOSURE

A hydraulic coupling formed in two separable halves with a port extending therethrough. Apertured plates disposed within the coupling are movable between an aligned and a non-aligned position. When the apertures are in alignment, fluid is allowed to pass through the coupling and when in non-alignment, the coupling can be disconnected without losing fluid contained in the hydraulic lines.

This invention relates to a quick-disconnect coupling used in conjunction with a hydraulic system operable at high temperatures or extremely high pressures. The coupling permits the hydraulic system to be disassembled without loss of hydraulic fluid and without contaminating this fluid during disassembly.

When operating a hydraulic system at pressures in excess of 4,000 p.s.i. or in an environment of 450° F., prior art hydraulic components and hydraulic fluids are inadequate to perform under these conditions. The hydraulic fluid inherently has a tendency to degrade when exposed to contaminants or when exposed to air due to a rapid oxidation of the fluid at these temperatures. Accordingly, it is necessary to prevent exposure of the fluid to air during assembly or repair. Further, the high cost of fluids which can function at 450° F. make it attractive to prevent loss of the fluid during disassembly, maintenance, or repair of the hydraulic system. An example of an installation of a hydraulic system in this environment is a proposed supersonic transport which must operate at peak altitudes and speeds that generate a skin friction which will raise the temperature throughout the aircraft to 450° F.

Hydraulc systems which are required to operate at 4,000 p.s.i. are unable to function with common hydraulic lines. Pressures of this magnitude are generally restrained by hydraulic lines which are welded to a hydraulic device such as pumps, hydraulic cylinders, and the like. This type of construction inherently creates problems during the disassembly of the units since the welds must be broken in order to remove a component and this leads to extensive long down time plus the problem of contamination within the hydraulic system. For installations where the hydraulic systems are difficult to reach such as in an aircraft wing or other restricted areas, a welded type construction would not permit disassembly of the hydraulic system without disassembly of the aircraft which leads to major complications.

When considering a hydraulic system which must perform under pressures of 4,000 p.s.i. and operate in a temperature environment of 450° F., the problems identified are compounded to the point that the components available from the prior art are no longer considered adequate to cope with the problems of contamination and disassembly.

Accordingly, in accordance with the present invention, a quick-disconnect coupling has been developed which is capable of withstanding a sustained environment of 4,000 p.s.i. and operating at 450° F. This coupling can be closed and disassembled without the loss of pressure and without contamination of hydraulic fluid within hydraulic lines leading to the coupling. This type of construction enables a rapid disassembly of a hydraulic device from the system thereby allowing its repair. The hydraulic device can be refilled with hydraulic fluid and reinstalled into the hydraulic system without permitting contamination of the hydraulic fluid by foreign material or oxygen. The quick-disconnect coupling constructed in accordance with the present invention uses a pair of opposing seals cooperating with a pair of sliding metal plates that abut each other to perform the sealing function when the coupling is disassembled.

Basically the present invention is useful within a hydraulic system by connecting the hydraulic disconnect coupling to a hydraulic device. The coupling is formed in two separable halves with a port extending therethrough and including a pair of plates which are slidable within the coupling and each having an opening therethrough. Rigid hydraulic lines are secured to the coupling and to the hydraulic device. The hydraulic plates are movable between a first position wherein the plate openings are aligned with the coupling ports and a second position where the plate opening is out of alignment with the coupling ports. This construction permits the coupling to be separated when the coupling plate is in the second position without losing fluid through the coupling.

More specifically, the disconnect coupling constructed in accordance with the present invention is formed with a pair of separable mating, hollow housings in abutting relations being held together by fastening means and having a port extending through the housings. A pair of plates mate with each other and are mounted between the pair of housings, one plate retained and slidable relative to each housing. Each of the plates have ports therethrough which match the ports through the housings. A means is provided for sliding the plate relative to the housings so as to move the plate ports between an open position wherein the plate ports match the housing ports and a closed position wherein the plate closes off the housing ports. The plates have an annular groove formed between the plates and adjacent to the plate port with a metallic seal being disposed between the plate groove for purposes of sealing the joint between the abutted plates. A pair of sealing rings are disposed on opposite sides of the plates within the housings and each having a reduced rim portion abutting the respective plate. A pair of second metallic seals being disposed one each within the housing ports and abutting the sealing rings and the housing groove.

Other features and advantages for the present invention will become apparent upon review of the appended description and the following drawings in which:

FIGURE 1 is a plan view of a quick-disconnect coupling constructed in accordance with the present invention and partially broken away to illustrate the interior;

FIGURE 2 is a cross-sectional view taken along line 2—2 of FIGURE 1 and illustrating the interior of the coupling;

FIGURE 3 is a side elevation of the quick-disconnect coupling constructed in accordance with the present invention and assembled upon an hydraulic cylinder with the coupling shown in a position which permits the cylinder to be operated; and FIGURE 4 is a side elevation of the hydraulic cylinder and quick-disconnect coupling illustrated in FIGURE 3 with the coupling shown in a closed position and the housings being separated.

Referring now to all the figures, a hydraulic disconnect coupling 10 includes a pair of separable mating hollow housings 12 and 14 having at least one port extending therethrough, and in this embodiment the housings have three ports 16, 18 and 20. A plurality of conventional threaded fasteners 22 retain the housings together. A pair of plates 24 and 26 are mounted within the housings 12 and 14 and operate between a closed position best illustrated in FIGURE 4 wherein the ports 16, 18 and 20 within the housings are closed and an open position best illustrated in FIGURE 3 wherein the plates are moving to a position where the ports are opened, permitting a fluid to pass therethrough. A means for sliding the plates in the form of a gear and rack arrangement 28, better shown in FIGURES 3 and 4, permit the plate to be shifted between its open and closed positions. One feature of this invention is apparent in FIGURE 4 wherein the coupling 10 is shifted so that its plates are in its closed position and the housings 12 and 14 are separated to permit installation or repair of a hydraulic device such as a hydraulic cylinder 31.

Referring now to FIGURES 1 and 2, the plates 24 and 26 are each formed from substantially flat elongated rectangular metal bars and are accurately fitted within a respective cavity 12A and 14A in the housings. Plate 24 has dovetailed surfaces 24A and 24B being fitted and retained within a mating dovetailed opening in the cavity 14A of the housing 14. The mating plate 26 likewise has dovetailed surfaces 26A and 26B fitting and being retained by a mating dovetail formed in the housing cavity 12A. This dovetail construction permits the plates 24 and 26 to be laterally shifted within the housings 12 and 14 by a pinion 30 engaging a rack 32 and 33 cut along a portion of each respective plate 26 and 24. Thus by rotating the pinion 30 which is supported within the housings 12 and 14, the plates 24 and 26 move as a unit within the housings. The pinion 30 has a pair of shafts 34 and 36 extending from opposite sides therefrom which are respectively journaled within respective bushings 38 and 40 that are in turn pressed within the respective housings 12 and 14. A square head 42 extends from the shaft 36 and permits the pinion 30 to be rotated by a conventional wrench.

Each plate 24 and 26 is sealed with respect to each other and for this purpose a pair of rectangular hardened steel inserts 44 and 46 are mounted within each respective plate 24 and 26. These inserts are ground and lapped and accurately fitted within each respective plate. The lower plate 24 has an upstanding circular boss 48 which extends within the mating plate 26 for purposes of both limiting the amount of sealing area and also for indexing the plates with relation to each other. The boss 48 has an opening 50 which is substantially larger than ports 44A and 46A which extend through the respective inserts 44 and 46. The ports 44A and 46A are of the same size as the ports 16 as shown in FIGURE 2 in order to permit fluid to flow through the coupling 10 when the plates are in an open position as illustrated in FIGURES 2 and 3. This arrangement allows a conventional metallic seal 52 having a generally E-shaped cross-section to be inserted between the inserts 44 and 46 for purposes of sealing the joint between the mating plates 24 and 26. For hydraulic applications, the metallic seal is preferably formed from a high-strength, heat-resisting material such as Inconel-X to withstand the high pressures and temperatures subjected upon it and is compressed in its installation as shown in FIGURE 2 to a height less than its deformation point so that the seal can be reused repeatedly after disassembly and assembly.

Annular sealing rings 54 and 56 are identically shaped and are mounted within the respective housings 12 and 14 and each has a rim portion 58 and 60 which respectively abut the hardened inserts 44 and 46. The sealing ring rim portion and the hardened inserts are both ground and lapped to an optical flatness in order to prevent leakage of hydraulic fluid past the inserts when the plates are disposed in an open or a closed position as shown in FIGURES 3 and 4. The differential pressure operating on opposite sides of the sealing rings 54 and 56 constantly urge the rings against the inserts in a conventional manner.

For purposes of sealing the sealing rings 54 and 56 against the housings 12 and 14, a pair of conventional metallic seals 62 and 64 engage the sealing rings 54 and 56 and are retained within a cavity 66 and 68 formed in the respective housings 12 and 14. The metallic seals 62 and 64 are also partially compressed to prevent leakage of fluid past sealing ring and the housing.

While not illustrated, the ports 18 and 20 have an identical construction as illustrated in FIGURE 2 with relation to port 16 including all metallic seals and sealing rings. While this present embodiment has three ports, it is to be understood that the coupling necessarily requires only one port and the number of ports is determined primarily by the type of hydraulic system being constructed.

The operation will now be explained and referring now to FIGURES 3 and 4, the coupling 10 is connected to the hydraulic cylinder 31. The cylinder 31 is illustrated and described merely as one of many hydraulic components which can be used in conjunction with the present invention. The conventional hydraulic cylinder 31 includes a cylinder 67 having a piston 69 and a piston shaft 70 operating therein. A primary seal 72 is mounted within one end of the cylinder 67 and operates in conjunction with a secondary seal 74 in order to prevent leakage of a hydraulic fluid 78 from the interior of the cylinder 67. For ultrahigh pressure and temperature applications, all hydraulic lines which are coupled between the hydraulic cylinder 31 and the coupling 10 are of extra heavy construction and also are welded at all joints to prevent leakage. The present invention is best applied in those installations where all connections between components are all rigid and disassembly or repair of the hydraulic systems would in fact be quite difficult and entail a vast amount of rework when using a coupling of the variety known in the prior art.

For purposes of ducting fluid through the coupling 10 into the hydraulic cylinder 31, the primary line 80 is connected to a conventional hydraulic pump (not shown) and also is welded to the housing 12. The hydraulic fluid passes through the coupling 10, with the plates 24 and 26 in the position as illustrated in FIGURE 3. A second hydraulic line 82 is welded to the housing 14 and to the hydraulic cylinder 67 in order to duct fluid through the coupling and into the cylinder. An exhaust hydraulic line 84 is welded between the cylinder 67 at a boss 86 for purposes of transferring hydraulic fluid from the cylinder and through the coupling and is connected to the coupling port 18 by welding to the housing 14. Another hydraulic line (not shown) is welded to the housing 12 for purposes of ducting the hydraulic fluid through the coupling and from the line 84 to a conventional sump (not shown). A controlled amount of leakage of hydraulic fluid 78 from the cylinder flows past the primary seal 72 and is returned to a conventional sump (not shown) through a return line 90 which is welded to a manifold 92 forming an end of the hydraulic cylinder 67. The return line 90 is secured to the housing 14 for purposes of ducting the return fluid through the coupling port 20 and is thereafter returned to the sump (not shown). It is to be noted that all the hydraulic lines connected to the cylinder are coupled to the housing 14 which permits the coupling to be separated without opening any of the lines, as best shown in FIGURE 4.

For purposes of removing the hydraulic cylinder 31 from the coupling 10, the plates 24 and 26 are moved to a closed position, as shown in FIGURE 4, by rotating the square head 42. The pinion 30 linearly shifts the plates 24 and 26 until the ports 16, 18 and 20 are all closed as shown in FIGURE 4. The fasteners 22 are withdrawn and the housings 12 and 14 can be separated without loss of hydraulic fluid in any of the hydraulic lines or contamination of any of the fluid. While not illustrated, the hydraulic device such as the hydraulic cylinder may be disassembled, cleaned, repaired and reassembled in a manner well known in the art. The hydraulic lines can be refilled with hydraulic fluid and the housing 14 rewelded upon the lines without permitting contamination or foreign particles or matter to be introduced into the system.

Thereafter, the housings 12 and 14 can be abutted with each other using the boss 48 on the plate 24 to index the proper relation of the housings. The fasteners 22 are reinstalled and tightened. The pinion 30 is rotated by applying torque to the square end 42 thereby shifting the position of the plates 24 and 26 and re-establishing flow of hydraulic fluid through the coupling 10 as shown in FIGURE 3. Thus it is apparent that the advantage of the present invention can be utilized in ultrahigh pressure and temperature hydraulic systems in a manner not known in the prior art.

While a particular embodiment of the present invention has been illustrated in the drawings, it is readily apparent that a part of the coupling can be integrated within a hydraulic component without departing from the spirit of the present invention. Further, the number and the types of ports can be varied to suit the particular environment of the hydraulic system or the peculiarities of a particular hydraulic device. Another alternative within the spirit of the invention extends to a quick-disconnect coupling which has a principle of rotating rather than linear movement of the plates in order to open and close a series of ports through the coupling. It is also apparent that other variations of the type described can be incorporated in a coupling of the present invention without departing from this invention.

We claim:

1. A hydraulic disconnect coupling comprising:
   a pair of separable mating hollow housings in abutting relation and having at least one port extending through the housings and the housings being held together by a fastening means;
   a pair of plates mating and abutting each other and being mounted between the pair of mating housings with one plate being retained and slidable relative to each housing the plates being disposed entirely within the housings;
   an insert extending within each of the plates, each insert and each plate having ports therethrough which match the ports through the housings;
   the inserts defining an annular groove between both the inserts and the plate ports;
   means for sliding the plates relative to the housings so as to move the plate ports between an open position wherein the plate ports match the housing ports and a closed portion wherein the plates close off the housing ports;
   a metallic seal being disposed in the annular groove and sealing the joint between the abutting plates;
   a pair of sealing rings being slidably disposed within the housing with one sealing ring on opposite sides of the plates and each having a reduced rim portion abutting the respective plate insert; and
   a plurality of second metallic seals being disposed one each within the housing ports and abutting the sealing rings and the housing.

2. A hydraulic disconnect coupling comprising:
   a pair of separable mating hollow housings in abutting relation and having at least one port extending through the housings and the housings being held together by a fastening means;
   a first and second plate mating and abutting each other and being mounted between the pair of mating housings with one plate being retained and slidable relative to each housing, the plates being disposed entirely within the housings;
   an insert extending within each of the plates each insert and each plate having ports therethrough which match the ports through the housings;
   the first plate having an upstanding annular post around the plate port and the post extending within and mating with the second plate for indexing the first plate to the second plate;
   the inserts defining an annular groove therebetween;
   means for sliding the plates relative to the housings so as to move the plate ports between an open position wherein the plate ports match the housing ports and a closed portion wherein the plates close off the housing ports;
   a metallic seal being disposed in the annular groove and sealing the joint between the abutting plates;
   a pair of sealing rings being slidably disposed within the housing with one sealing ring on opposite sides of the plates and each having a reduced rim portion abutting the respective plate insert; and
   a plurality of second metallic seals being disposed one each within the huosing ports and abutting the sealing rings and the housing groove.

3. A hydraulic disconnect coupling comprising:
   a pair of separable mating hollow housings in abutting relation and having at least one port extending through the housings and the housings being held together by a fastening means;
   a pair of plates mating and abutting each other and being mounted between the pair of mating housings with one plate being retained and slidable relative to each housing, the plates being disposed entirely within the housings;
   an insert extending within each of the plates, each insert and each plate having ports therethrough which match the ports through the housings;
   the inserts defining an annular groove therebetween and with the plate ports;
   means for sliding the plates relative to the housings so as to move the plate ports between an open position wherein the plate ports match the housing ports and a closed portion wherein the plates close off the housing ports;
   a first means for sealing pressure up to 4000 p.s.i. being disposed in the annular groove and sealing the joint between the abutting plates;
   a pair of sealing rings being disposed within the housing with one sealing ring on opposite sides of the plates and each having a reduced rim portion abutting the respective plate insert; and
   a second means for sealing pressure up to 4000 p.s.i. being disposed one each within the housing ports and abutting the sealing rings and the housing.

4. A hydraulic disconnect coupling comprising:
   a pair of separable mating hollow housings in abutting relation and having at least one port extending through the housings and the housings having a continuous flange therearound being held together by a fastening means;
   a pair of plates mating and abutting each other and being mounted between the pair of mating housings with one plate being retained and slidable relative to each housing, the plates being disposed entirely within the housings,
   an insert extending within each of the plates, each insert and each plate having ports therethrough which match the ports through the housings,
   the inserts defining an annular groove therebetween;
   means for sliding the plates relative to the housings so as to move the plate ports between an open position wherein the plate ports match the housing ports and a closed portion wherein the plates close off the housing ports;
   a plurality of seals being formed in a metal sheet in an annular configuration and having an "E" shaped cross section, an outer portion of the cross section being flexible such that fluid pressure would tend to expand the outer portion, one of the metallic seals being disposed in the annular groove and sealing the joint between the abutting plates;
   a pair of sealing rings being disposed within the housing with one sealing ring on opposite sides of the plates and each having a reduced rim portion abutting the respective plate insert; and a plurality of the second metallic seals being disposed one each within the housing ports and abutting the sealing rings and the housing.

5. A hydraulic disconnect coupling comprising:

a pair of separable mating hollow housings in abutting relation and having at least one port extending through the housings and the housings having a continuous flange being held together by a fastening means;

a first and second plate mating each other and being mounted between the pair of mating housings with one plate being retained and slidable relative to each housing, the plates being disposed entirely within the housings, each of the plates having a hardened insert extending therein and each of the inserts has a port extending therethrough, the first plate has a cylindrical upstanding post extending therefrom and extending within and mating with the second plate for indexing the plates relative to each other, the plates having apertures therethrough which match the ports through the housing and the first post extends through the second plate aperture, said hardened inserts and said aperture in said first plate defining a groove within the post, both plates having a series of gear teeth formed thereon;

a pinion extending within and supported in the housings and engaging the plate gear teeth, the pinion including a shaft having an end extending through one of the housings such that the shaft can be rotated to shift the plates between an open position wherein the plate ports match the housing ports and a closed position wherein the plates close off the housing ports;

a plurality of seals being formed from a metal sheet in an annular configuration and having an "E" shaped cross section, an outer portion of the cross section being flexible, one of the seals being disposed within said groove with the outer portions contacting the plate inserts such that fluid pressure would increase the pressure of the flexible portions against the inserts, each of the housings having a closed cylindrical cavity extending from the plates retained in each respective housing;

a sealing ring being disposed within each housing cylindrical cavity and each having a reduced rim portion abutting the respective plate hardened insert; and a second metallic seal being disposed within each housing cylindrical cavity and the flexible portion of the seal abutting the sealing ring and the housing.

References Cited

UNITED STATES PATENTS

| | | | |
|---|---|---|---|
| 886,208 | 4/1908 | Hadley | 251—250 |
| 2,235,612 | 3/1941 | Graney | 251—250 X |
| 2,399,516 | 4/1946 | Snyder | 137—614.01 |
| 2,828,146 | 3/1958 | Abbey | 137—614.01 |
| 2,834,613 | 5/1958 | Snyder | 137—614.01 |
| 2,854,209 | 9/1958 | Erwin | 251—239 X |
| 2,974,636 | 3/1961 | Farmer | 92—109 X |
| 3,068,895 | 12/1962 | Grove | 251—329 X |
| 3,109,624 | 11/1963 | Edwarde | 251—367 X |
| 3,233,523 | 2/1966 | Passaggio | 92—59 X |

MARTIN P. SCHWADRON, *Primary Examiner.*

I. C. COHEN, *Assistant Examiner.*